US009287067B2

(12) United States Patent
Mustonen

(10) Patent No.: US 9,287,067 B2
(45) Date of Patent: Mar. 15, 2016

(54) PRINTABLE POLARITY SWITCH

(75) Inventor: Tero Mustonen, Binningen (CH)

(73) Assignee: BASF SE, Ludwigshafen (DE)

( * ) Notice: Subject to any disclaimer, the term of this patent is extended or adjusted under 35 U.S.C. 154(b) by 922 days.

(21) Appl. No.: 13/497,445

(22) PCT Filed: Sep. 20, 2010

(86) PCT No.: PCT/EP2010/063766
§ 371 (c)(1), (2), (4) Date: Mar. 21, 2012

(87) PCT Pub. No.: WO2011/036110
PCT Pub. Date: Mar. 31, 2011

(65) Prior Publication Data

US 2012/0313453 A1 Dec. 13, 2012

(30) Foreign Application Priority Data

Sep. 24, 2009 (EP) .................................... 09171233

(51) Int. Cl.
*H02J 4/00* (2006.01)
*H01H 11/00* (2006.01)
(Continued)

(52) U.S. Cl.
CPC ............. *H01H 13/704* (2013.01); *H01H 13/88* (2013.01); *H01H 13/785* (2013.01); *H01H 13/81* (2013.01);
(Continued)

(58) Field of Classification Search
CPC ........ H01H 11/00; H01H 13/76; H01H 13/88
USPC .......................................... 307/112; 135/173
See application file for complete search history.

(56) References Cited

U.S. PATENT DOCUMENTS 3,988,551 A 10/1976 Larson
4,682,801 A * 7/1987 Cook .................... E05C 19/166
292/251.5

(Continued)

FOREIGN PATENT DOCUMENTS

JP 62-020206 A 1/1987
JP 03-094095 U 9/1991

(Continued)

OTHER PUBLICATIONS

International Search Report Issued Jan. 7, 2011 in PCT/EP10/63766 Filed Sep. 20, 2010.

(Continued)

*Primary Examiner* — Jared Fureman
*Assistant Examiner* — Emmanuel R Dominique
(74) *Attorney, Agent, or Firm* — Oblon, McClelland, Maier & Neustadt, L.L.P.

(57) ABSTRACT

Switch assembly for changing the direction of current from a power source to an appliance comprising—at least four wirings, two of the wirings are connectable with the power source and the remaining wirings are connectable with the appliance,—all wirings are fixed on the surface of a substrate and none of the wirings are directly connected to each other,—a first button comprising a first conductive pattern on one surface of said button,—a second button comprising a second conductive pattern on one surface of said button,—the surfaces of the buttons on which the conductive patterns are arranged face the surface of said substrate where the wirings are arranged,—the buttons are fixed on the substrate—the conductive patterns on the buttons and said wirings on the surface of the substrate are arranged in such a manner and said buttons are placed on said substrate in such manner, that (i) said conductive patterns on the buttons are not in contact with said wirings in an unpressed state of the buttons, (ii) one button connects by means of the conductive pattern in a pressed state simultaneously the first wiring of the two wirings with one wiring of the remaining wirings and the second wiring of the two wirings with another wiring of the remaining wirings to enable a first current path through the switch assembly, and (iii) the other button connects by means of the conductive pattern in a pressed state the first wiring of the two wirings with one wiring of the remaining wirings and the second wiring of the two wirings with another wiring of the remaining wirings to enable a second current path through the switch assembly being different to the first current path, wherein further the conductive patterns comprise a composition (CO) comprising a polymer and a conductive material dispersed in said polymer and/or a conjugated polymer.

20 Claims, 4 Drawing Sheets

Figure 1:
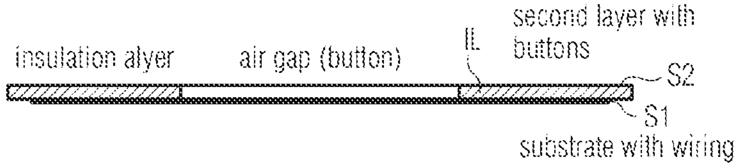

(51) Int. Cl.

| | |
|---|---|
| ***H01H 13/76*** | (2006.01) |
| ***H01H 13/704*** | (2006.01) |
| ***H01H 13/88*** | (2006.01) |
| *H01H 13/785* | (2006.01) |
| *H01H 13/81* | (2006.01) |

(52) U.S. Cl.
CPC .... *H01H 2207/004* (2013.01); *H01H 2229/004* (2013.01); *H01H 2229/03* (2013.01); *Y10T 29/49105* (2015.01); *Y10T 307/74* (2015.04)

(56) References Cited

U.S. PATENT DOCUMENTS

| | | | | |
|---|---|---|---|---|
| 4,916,275 | A | 4/1990 | Almond | |
| 7,523,546 | B2 * | 4/2009 | Vatanparast et al. | 29/832 |
| 9,083,065 | B2 * | 7/2015 | Carkner | H01M 10/5006 |
| 2005/0241927 | A1 | 11/2005 | Kim | |
| 2006/0248713 | A1 * | 11/2006 | Vatanparast | H04M 1/0283 29/832 |
| 2007/0001196 | A1 * | 1/2007 | Nonaka | G06F 17/5068 257/207 |
| 2007/0222763 | A1 * | 9/2007 | Spath | G06F 3/0416 345/173 |
| 2009/0120672 | A1 | 5/2009 | Vatanparast et al. | |

FOREIGN PATENT DOCUMENTS

| | | | | |
|---|---|---|---|---|
| JP | 10-097818 | A | 4/1998 | |
| JP | 2002-367469 | A | 12/2002 | |
| JP | 2002-367481 | A | 12/2002 | |
| JP | 2002367481 | * | 12/2002 | H01H 11/00 |
| JP | 2003-303529 | A | 10/2003 | |
| WO | 2006 117659 | | 11/2006 | |

OTHER PUBLICATIONS

Office Action issued Aug. 11, 2014 in Japanese Patent Application No. 2012-530226 (submitting English translation only).

U.S. Appl. No. 13/988,392, filed May 20, 2013, Mustonen, et al.

* cited by examiner

PRINTABLE POLARITY SWITCH

The present invention is directed to a new switch assembly for electrical circuit as well as to its manufacture.

Switches are indispensable in electronics as they control the current flow in electrical circuits. Typical members of the switches are the single pole, single throw switch (SPST), the single pole, double throw switch (SPDT), the single pole, changeover switch (SPCO), the double pole, single throw switch (DPST), and the double pole, double throw switch (DPDT). For instance the DPST switch is used in electrical circuits to change polarity between a power source and the appliance. To date only mechanical switches have been applied in this technical field. However mechanical electrics are cost-intensive and spacious. Nowadays efforts are undertaken to produce assemblies which are of lower dimensions and thus space saving. Further nowadays electrochromic displays are on the marked for which polarity change is essential enabling to unfold their full potential.

Accordingly the object of the present invention is to provide an electrical circuit which enables to produce electrical circuits being cost effective and can change polarity between the power source and the appliance. Further the electrical circuit shall be space-saving.

The finding of the present invention is that known switches enable to change polarity between the power source and the appliance and that they are spacious. A further finding of the present invention is that membrane switches are of low dimensions and thus space saving. Accordingly the present invention is directed to a switch assembly and electrical circuits containing such a switch assembly, wherein said switch assembly can change polarity between a power source and an appliance and further said switch assembly is produced by print technology.

Accordingly in a first aspect the present invention is directed to a switch assembly (SA) for changing the direction of current from a power source (PS) to an appliance (A) comprising at least four wirings, preferably four or six wirings, two of the wirings (W/PS) are connectable, preferably connected, with the power source (PS) and the remaining wirings (W/A), i.e. preferably two or four wirings, are connectable, preferably connected, with the appliance (A), all wirings are fixed on the surface (SF1) of a substrate (S1) and none of the wirings are directly connected to each other, a first button (B1) comprising a first conductive pattern (CP1) on one surface (SF2') of said button (B1), a second button (B2) comprising a second conductive pattern (CP2) on one surface (SF2") of said button (B2), the surfaces (SF2') and (SF2") of the buttons (B1) and (B2) on which the conductive patterns (CP1) and (CP2) are arranged face the surface (SF1) of said substrate (S1) where the wirings are arranged, the buttons (B1) and (B2) are arranged, i.e. fixed, directly or by means of an interlayer (IL) on the substrate (S1)

said conductive patterns (CP1) and (CP2) on the buttons (B1) and (B2) and said wirings on the surface (SF1) of the substrate (S1) are arranged in such a manner and said buttons (B1) and (B2) are placed on said substrate (S1) in such manner, that (i) said conductive patterns (CP1) and (CP2) on the buttons (B1) and (B2) are not in contact with said wirings in an unpressed state of the buttons (B1) and (B2), (ii) the button (B1) connects by means of the conductive pattern (CP1) in a pressed state simultaneously the first wiring of the two wirings (W/PS) with one wiring of the remaining wirings (W/A) and the second wiring of the two wirings (W/PS) with another wiring of the remaining wirings (W/A) to enable a first current path through the switch assembly, and (iii) the button (B2) connects by means of the conductive pattern (CP2) in a pressed state the first wiring of the two wirings (W/PS) with one wiring of the remaining wirings (W/A) and the second wiring of the two wirings (W/PS) with another wiring of the remaining wirings (W/A) to enable a second current path through the switch assembly being different to the first current path, wherein further the conductive patterns (CP1) and (CP2) comprise, preferably consist of, (a) a composition (CO) comprising a polymer and a conductive material dispersed in said polymer and/or (b) a conjugated polymer, preferably a conducting polymer.

Preferably the switch assembly is construed in a way that (ii) the button (B1) connects by means of the conductive pattern (CP1) in a pressed state simultaneously the first wiring (W'/PS) of the two wirings (W/PS) with one wiring (W'/A) of the remaining wirings (W/A) and the second wiring (W"/PS) of the two wirings (W/PS) with another wiring (W"/A) of the remaining wirings (W/A) to enable a first current path through the switch assembly, and (iii) the button (B2) connects by means of the conductive pattern (CP2) in a pressed state the first wiring (W'/PS) of the two wirings (W/PS) with one wiring of the remaining wirings (W/A), but being not the wiring (W'/A), preferably being not the wirings (W'/A) and (W"/A), and the second wiring (W"/PS) of the two wirings (W/PS) with another wiring of the remaining wirings (W/A), but being not the wiring (W"/A), preferably being not the wirings (W'/A) and (W"/A), to enable a second current path through the switch assembly being different to the first current path.

In a further aspect the present invention is directed electrical circuit comprising a power source (PS), an appliance (A) and a switch assembly (SA) for changing the direction of current from said power source (PS) to said appliance (A), said switch assembly (SA) comprises at least four wirings, preferably four or six wirings, two of the wirings (W/PS) are connected with the power source (PS) and the remaining wirings (W/A), i.e. preferably two or four wirings, are connected with the appliance (A), all wirings are fixed on the surface (SF1) of a substrate (S1) and none of the wirings are directly connected to each other, a first button (B1) comprising a first conductive pattern (CP1) on one surface (SF2') of said button (B1), a second button (B2) comprising a second conductive pattern (CP2) on one surface (SF2") of said button (B2), the surfaces (SF2') and (SF2") of the buttons (B1) and (B2) on which the conductive patterns (CP1) and (CP2) are arranged face the surface (SF1) of said substrate (S1) where the wirings are arranged, the buttons (B1) and (B2) are arranged, i.e. fixed, directly or by means of an interlayer (IL) on the substrate (S1)

said conductive patterns (CP1) and (CP2) on the buttons (B1) and (B2) and said wirings on the surface (SF1) of the substrate (S1) are arranged in such a manner and said buttons (B1) and (B2) are placed on said substrate (S1) in such manner, that (i) said conductive patterns (CP1) and (CP2) on the buttons (B1) and (B2) are not in contact with said wirings in an unpressed state of the buttons (B1) and (B2), (ii) the button (B1) connects by means of the conductive pattern (CP1) in a pressed state simultaneously the first wiring of the two wirings (W/PS) with one wiring of the remaining wirings (W/A) and the second wiring of the two wirings (W/PS) with another wiring of the remaining wirings (W/A) to enable a first current direction between said power source (PS) and said appliance (A), and (iii) the button (B2) connects by means of the conductive pattern (CP2) in a pressed state the first wiring of the two wirings (W/PS) with one wiring of the remaining wirings (W/A) and the second wiring of the two wirings (W/PS) with another wiring of the remaining wirings (W/A) to enable a reversed current direction in regard to the first current direction between said power source (PS) and said appliance (A), wherein further the conductive patterns (CP1) and (CP2) comprise, preferably consist of, (a) a composition (CO) comprising a polymer and a conductive material dispersed in said polymer and/or (b) a conjugated polymer, preferably a conducting polymer.

Preferably the switch assembly in the electrical circuit is construed in a way that (ii) the button (B1) connects by means of the conductive pattern (CP1) in a pressed state simultaneously the first wiring (W'/PS) of the two wirings (W/PS) with one wiring (W'/A) of the remaining wirings (W/A) and the second wiring (W"/PS) of the two wirings (W/PS) with another wiring (W"/A) of the remaining wirings (W/A) to enable a first current direction between said power source (PS) and said appliance (A), and (iii) the button (B2) connects by means of the conductive pattern (CP2) in a pressed state the first wiring (W'/PS) of the two wirings (W/PS) with one wiring of the remaining wirings (W/A), but being not the wiring (W'/A), preferably being not the wirings (W'/A) and (W"/A), and the second wiring (W"/PS) of the two wirings (W/PS) with another wiring of the remaining wirings (W/A), but being not the wiring (W"/A), preferably being not the wirings (W'/A) and (W"/A), to enable a reversed current direction in regard to the first current direction between said power source (PS) and said appliance (A).

In the following the electrical circuit and the switch assembly will be described in more detail together.

The following definitions apply throughout the present invention if not otherwise indicated:

A "wiring" is an electrical wiring which enables to transport current. The wiring can be typical metal cable like aluminum cable or copper cable, the latter being preferred. However it is in particular appreciated that the wiring is, like the conductive pattern, (a) a composition (CO) comprising a polymer and a conductive material dispersed in said polymer and/or (b) a conjugated polymer, preferably a conducting polymer.

Accordingly the wiring is preferably printed on a substrate as described in detail below.

A "conductive pattern" is a specific structure on the surface of a substrate, in particular on the surface of the buttons. The term "conductive pattern" indicates that the conductive material used for the "conductive pattern" is not a metal cable, like a copper cable. Accordingly, although the "conductive pattern" is no wiring cable it is able to transport current.

A "conductive contact" is part of the conductive pattern. Accordingly a conductive pattern may comprise several "conductive contacts" being separated from each other, i.e. being not in conductive contact. In other words between different "conductive contacts" of the conductive pattern no current can flow. Preferably a conductive pattern comprises, more preferably consists of, two "conductive contacts".

A "substrate" is a base material onto which a further component can be fixed. In the present application on the "substrate" the wirings and conductive pattern are fixed. More precisely the wirings and conductive patterns are applied on the "substrate" by electrode pattering technology. This technology includes deposition technology printing technology, shadow mask technology as well as transfer technology. Preferred technolgies are chemical vapor deposition, physical vapor deposition, vacuum evaporation, thermal evaporation, sputtering, coating and printing. Especially preferred aplied techniques are coating or printing, the latter is in particular preferred. Thus, the basic material can be any material suitable to fix, preferably to print or coat, a conductive composition leading to the respective conductive patterns (or wirings). Accordingly the "substrate" is preferably selected from the group consisting of a polymer, like a polymer film or foil, paper, coated paper, glass, and ceramic, more preferably the "substrate" is a polymer as described in detail below.

The term "directly connected" means that two conductors are connected to each other without any bridging element, like a switch. On the other hand "not directly connected" means that conductors are not in directed contact to each other but can be (conductively) connected by any means, preferably bridging elements, like a switch.

The term "button" is an actuator, i.e. a switch, enabling to connect unconnected wirings. Such a button can be in the form of an un-biased switch or in the form of a biased switch, the latter being preferred. Preferably the "button" is a "push-to-make" button, which makes contact when the button is pressed and breaks when the button is released. The "button" of the present invention is further preferably of a flat structure.

A "biased switch" according to this invention is one containing a mechanism that returns the actuator to a certain position. Typical member is the "push-to-make" button as defined in the previous paragraph. On the other hand "un-biased switch" remains in the adjusted position.

Each arrangement of the conductive patterns and each arrangement of the buttons are suitable as long as the overall construction of the switch assembly (SA) enables different current paths through it, i.e. change in polarity between the power source (PS) and the appliance (A), depending on the positions (on/off) of the buttons.

However it is in particular appreciated that the first conductive pattern (CP1) of the first button (B1) comprises, consists of, two conductive contacts (CC1) and (CC2), said first conductive conduct (CC1) connects in a pressed state of the button (B1) the first wiring (W'/PS) of the two wirings (W/PS) with one wiring (W'/A) of the remaining wirings (W/A), whereas the second conductive contact (CC2) connects in a pressed state of the button (B1) the second wiring (W"/PS) of the two wirings (W/PS) with another wiring (W"/A) of the remaining wirings (W/A) to enable a first current path through the switch assembly, i.e. a first current direction between said power source (PS) and said appliance (A).

On the other hand it is preferred that the second button (B2) comprises, consists of, two conductive contacts (CC3) and (CC4), said first conductive conduct (CC3) connects in a pressed state of the button (B2) the first wiring (W'/PS) of the two wirings (W/PS) with one wiring of the remaining wirings (W/A), but being not the wiring (W'/A), preferably being not the wirings (W'/A) and (W"/A), whereas the second conductive contact (CC4) connects in a pressed state of the button (B2) the second wiring (W"/PS) of the two wirings (W/PS) with another wiring of the remaining wirings (W/A), but being not the wiring (W"/A), preferably being not the wirings (W'/A) and (W"/A), to enable a second current path through the switch assembly being different to the first current path, i.e. to enable a reversed current direction in regard to the first current direction between said power source (PS) and said appliance (A).

Accordingly in one preferred embodiment the switch assembly (SA) for changing the direction of current from a power source (PS) to an appliance (A) comprises four wirings, two of the wirings (W/PS) are connectable, preferably connected, with the power source (PS) and two wirings (W/A) are connectable, preferably connected, with the appliance (A), wherein the first conductive pattern (CP1) of the first button (B1) comprises, consists of, two conductive contacts (CC1) and (CC2), said first conductive conduct (CC1) connects in a pressed state of the button (B1) the first wiring (W'/PS) of the two wirings (W/PS) with the one wiring (W'/A) of the remaining two wirings (W/A), whereas the second conductive contact (CC2) connects in a pressed state of the button (B1) the second wiring (W"/PS) of the two wirings (W/PS) with the other wiring (W"/A) of the remaining two wirings (W/A) to enable a first current path through the switch assembly, i.e. to enable a first current direction between said power source (PS) and said appliance (A), and the second button (B2) comprises, consists of, two conductive contacts (CC3) and (CC4), said first conductive conduct (CC3) connects in a pressed state of the button (B2) the first wiring (W'/PS) of the two wirings (W/PS) with the wiring (W"/A) of the remaining two wirings (W/A), whereas the second conductive contact (CC4) connects in a pressed state of the button (B2) the second wiring (W"/PS) of the two wirings (W/PS) with the wiring (W'/A) of the remaining two wirings (W/A), to enable a second current path through the switch assembly being different to the first current path, i.e. to enable a reversed current direction in regard to the first current direction between said power source (PS) and said appliance (A).

In another preferred embodiment the switch assembly (SA) for changing the direction of current from a power source (PS) to an appliance (A) comprises six wirings, two of the wirings (W/PS) are connectable with the power source (PS) and four wirings (W/A) are connectable with the appliance (A), wherein the first conductive pattern (CP1) of the first button (B1) comprises, consists of, two conductive contacts (CC1) and (CC2), said first conductive conduct (CC1) connects in a pressed state of the button (B1) the first wiring (W'/PS) of the two wirings (W/PS) with one wiring (W'/A) of the remaining four wirings (W/A), whereas the second conductive contact (CC2) connects in a pressed state of the button (B1) the second wiring (W"/PS) of the two wirings (W/PS) with the another wiring (W"/A) of the remaining four wirings (W/A) to enable a first current path through the switch assembly, i.e. to enable a first current direction between said power source (PS) and said appliance (A), and the second button (B2) comprises, consists of, two conductive contacts (CC3) and (CC4), said first conductive conduct (CC3) connects in a pressed state of the button (B2) the first wiring (W'/PS) of the two wirings (W/PS) with a third wiring (W'"/A) of the remaining four wirings (W/A), whereas the second conductive contact (CC4) connects in a pressed state of the button (B2) the second wiring (W"/PS) of the two wirings (W/PS) with a fourth wiring (W""/A) of the remaining four wirings (W/A), to enable a second current path through the switch assembly being different to the first current path, i.e. a reversed current direction in regard to the first current direction between said power source (PS) and said appliance (A), wherein preferably further the first wiring (W'/A) and the fourth wiring (W""/A) of the remaining four wirings (W/A) lead to the same first connector (C'/A) of the appliance (A) whereas the second wiring (W"/A) and the third wiring (W'"/A) of the remaining four wirings (W/A) lead to the same second connector (C'/A) of the appliance (A).

Two principle layer constructions of the switch assembly (SA) are preferred

In one embodiment the switch assembly does not comprise an interlayer (IL). Accordingly the switch assembly (SA) comprises the first substrate (S1) and a second substrate (S2), wherein the surface (SF1) of the substrate (S1) faces the substrate (S2), the substrates (S1) and (S2) are laminated together, the second substrate (S2) comprises embossings in the amount of conductive patterns, e.g. two embossings, being convex to the surface (SF1) of the substrate (S1), the conductive patterns, preferably the first conductive pattern (CP1) and the second conductive pattern (CP2), are fixed on the surface of the second substrate (S2) which faces the first substrate (S1), each of the conductive patterns, preferably each of the two conductive patterns (CP1) and (CP2), is located in one of the embossings, preferably in one of the two embossings, so that each conductive pattern forms with one embossing a button, i.e. the conductive pattern (CP1) forms with one embossing the button (B1) and the conductive pattern (CP2) forms with the other embossing the button (B2).

In the other embodiment the switch assembly comprises an interlayer (IL), i.e. an insulation layer. Accordingly the switch assembly (SA) comprises the first substrate (S1), an interlayer (IL), i.e. an insulation layer, and a second substrate (S2), the surface (SF1) of the substrate (S1) faces the interlayer (IL), i.e. the insulation layer, the interlayer (IL), i.e. the insulation layer, is between the first substrate (S1) and the second (S2) substrate, the insulation layer (IL) comprises holes in the amount of conductive patterns, i.e. preferably two holes, the conductive patterns, preferably the first conductive pattern (CP1) and the second conductive pattern (CP2), are fixed on the surface of the second substrate (S2) which faces the insulation layer (IL), each of the conductive patterns, preferably the two conductive patterns (CP1) and (CP2), is located above one of the holes, so that each of the conductive patterns forms with one hole a button, i.e. preferably the conductive pattern (CP1) forms with one hole the button (B1) and the conductive pattern (CP2) forms with the other hole the button (B2).

As stated above the conductive patterns, i.e. the first conductive pattern (CP1) and the second conductive pattern (CP2), and preferably also the wirings are printed on the substrates. Accordingly it is appreciated that the conductive patterns, i.e. the first conductive pattern (CP1) and the second conductive pattern (CP2), and optionally the wirings comprise, preferably consist of, (a) a composition (CO) comprising a polymer and a conductive material dispersed in said polymer and/or
(b) a conjugated polymer, preferably a conducting polymer.

The composition (CO) preferably comprises a conductive material selected from the group consisting of silver, silver alloy, gold, gold alloy, aluminium, aluminium alloy, nickel, nickel alloy, platinum, platinum alloy, palladium, palladium alloy, copper, copper alloy, carbon, iron, iron alloy, indium tin oxide (ITO), antimony tin oxide (ATO), and mixtures thereof, more preferably silver. Within the scope of conductive material is also a conductor-coated material such as organic polymer particles coated by silver, copper or nickel. In a preferred embodiment the conductive material is in fine flake particle form. The predominant portion of the conductive material has an average particle size in the range from about one to about ten microns. Based upon the total weight of the composition (CO), the conductive material lies in the range from 30 to 80 wt.-%. More preferably, the conductive material lies in the range from 60 to 65 wt.-%. The remainder constitutes the polymer material of the composition.

So long as at least 30 wt.-% of the composition is conductive material, up to a maximum 40 wt.-% nonconductive filler particles can be used. Materials which can be used for this purpose include glass beads, clay and polymers which are insoluble in a polar solvent.

Typically, the polymer can be selected from the group consisting of ABS (acrylonitrile-butadiene-styrene), ASA (acrylonitrile-styrene-acrylate), acrylated acrylates, alkyd resins, alkylvinyl acetates, alkylene-vinyl acetate copolymers, in particular methylene-vinyl acetate, ethylene-vinyl acetate, butylene-vinyl acetate, alkylene-vinyl chloride copolymers, amino resins, aldehyde resins, ketone resins, cellulose, cellulose derivatives, in particular alkylcellulose, cellulose esters, such as cellulose acetates, cellulose propionates, cellulose butyrates, cellulose ethers, carboxyalkylcelluloses, cellulose nitrate, epoxy acrylates, epoxy resins, ethylene-acrylic acid copolymers, hydrocarbon resins, MABS (transparent ABS having acrylate units present), maleic anhydride copolymers, methacrylates, if appropriate amine-functionalized, natural rubber, synthetic rubber, chlorinated rubber, naturally occurring resins, rosins, shellac, phenolic resins, polyesters, polyester resins, such as phenyl ester resins, polysulfones, polyether sulfones, polyamides, polyimides, polyanilines, polypyrroles, polybutylene terephthalate (PBT), polycarbonate (e.g. Makrolon® from Bayer AG), polyester acrylates, polyether acrylates, polyethylene, polyethylene-thiophenes, polyethylene naphthalates, polyethylene terephthalate (PET), polyethylene terephthalate glycol (PETG), polypropylene, polymethyl methacrylate (PMMA), polyphenylene oxide (PPO), polytetrafluoroethylene (PTFE), polytetrahydrofuran, polyvinyl compounds, in particular polyvinyl chloride (PVC), PVC copolymers, PVdC, polyvinyl acetate, and copolymers of these, polyvinyl alcohol if appropriate in partially hydrolyzed form, polyvinyl acetates, polyvinylpyrrolidone, polyvinyl ethers, polyvinyl acrylates, and polyvinyl methacrylates in solution and in the form of a dispersion, and their copolymers, polyacrylic esters and polystyrene copolymers; polystyrene (impact-resistant or without impact modification), polyurethanes, non-crosslinked or treated with isocyanates; polyurethane acrylates; styrene-acrylic copolymers; styrene-butadiene block copolymers (e.g. Styroflex® or Styrolux® from BASF AG, K-Resin™ from CPC), proteins, e.g. casein, SIS, SPS block copolymers, and mixtures thereof.

Preferred polymers are polyalkylenes, polyimides, epoxy resins, phenolic resins, polyester, styrene-butadiene block copolymers, alkylene-vinyl acetates and alkylene-vinyl chloride copolymers, polyamides, and their copolymers.

The term "conjugated polymer" according to this invention is understood according to the definition of IUPAC (2nd Edition (1997)). Accordingly a "conjugated polymer is preferably a polymer system whose structure is represented by alternating single and double bonds, like $—CH_2═CH—CH═CH_2—$. In such a system, conjugation is the interaction of one p-orbital with another across an intervening s-bond in such structures. (In appropriate molecular entities d-orbitals may be involved.) The term is also extended to the analogous interaction involving a p-orbital containing an unshared electron pair, e.g.: $Cl—CH═CH_2$. Preferably the conjugated polymer is a conductive polymer. The term "conductive polymer" is understood as according to the definition of IUPAC (2nd Edition (1997)). Thus a conudctive polymer is a polymer that exhibits bulk electric conductivity. Therefore the conjugated polymer, preferably the conductive polymer, is preferably selected from the group consisting of polymerized anthracenes, polymerized perylenes, polyaromatic hydrocarbons, polyacetylene, polyphenylene, polyphenylene sulfide ("PPS"), polyphenylene vinylene (PPV), polypyrrole, polythiophene, and polyaniline. It is especially preferred that the conjugated polymer is the polythiophene. An preferred commercial product is polyethylenedioxythiophene:polystyrenesulphonate, (PE-DOT:PSS) or mixtures thereof like PSS in PEDOT:PSS.

The composition (CO) and/or the conjugated polymer may be dissolved for applying it/them on the substrate. The solvent used can be any solvent dependent on the individual polymer used. For instance polythiophene and polyaniline are usually dissolved in toluene, chloroform, o-dicholorobenzene and other similar solvents. Polyaniline is in particular available as toluene and water-based solutions, like the commercial products Panipol T and Panipol W. Such mentioned solvents are preferably sufficiently volatile that it can be vaporized from the composition (CO) and/or the conjugated polymer below the thermal degradation temperature of the substrate. Such materials include esters, alcohols, acetates and ethers as well as halogenated aromatics and non-halogenated aromatics, like toluene, xylene and tetraline. Though halogenated aromatics such o-dichlorobenzene are fully operable in the invention, they are not preferred because of the health hazards which may be associated with them. Preferred solvents therefore include materials such as toluene, tetraline, ethylene glycol phenyl ether, benzyl alcohol, glycol ether acetates, and carbitol acetate. Carbitol acetate is especially preferred and most preferred is toluene. Mixtures of various solvents will frequently be used in order to adjust the volatility of the solvent component of the organic medium.

In general, the boiling point of the solvent component(s) should be no less than 100° C. 150° C. A boiling point range of from 105 to 220° C. is preferred. Within this range the volatility of the solvent will be selected in consideration of the method of solvent removal and/or fabrication. For example, when the high speed reel-to-reel procedure is used it is essential that the solvent be removed quite rapidly during processing. In either case the solvent removal is ordinarily accelerated by mildly heating the printed substrate. Typically, the substrate is heated in a hot air oven to 70 to 120° C. when using more volatile solvents in the reel-to-reel process and 90 to 140° C. when using less volatile solvents in the semiautomatic processes.

The material used in the present application for the substrates is preferably selected from the group consisting of paper, cardboard, cellulose derivatives (cellulose acetates, nitrates, esters), carboxymethyl cellulose (CMC), polyimide (Kapton), polysulfone, polyethersulfone, polyacrylonitrile, polyamide, polyacrylates (PMMA), PTFE, PVDF polyethylene, polypropylene, polyester, and polyvinyl halides. Material for the substrate (S1) and (S2) can be different, but it is appreciated that it is the same.

Further any power source (PS) is applicable for the present invention, however it is preferred that it produces direct current. Thus in a preferred embodiment the power source is a battery. The appliance (A) can be of any type. However preferred appliances are those operated by direct current (DC), like displays, like electrochromic displays or electrochemical displays, electrical motors and electrical testing devices. In case of alternating current (AC) the appliance can be for instance a speaker FIG. 1 and FIG. 1*a* illustrate a first preferred embodiment of a button of a switch assembly (SA) (released and pressed state) comprising an interlayer (IL).

Figure 2:
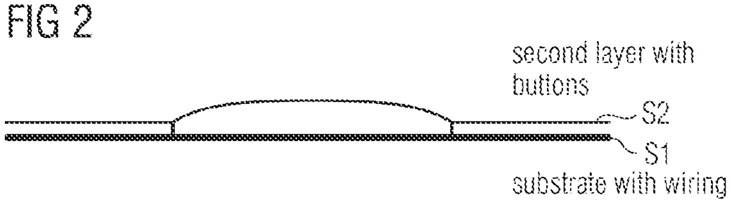
Figure 2A:
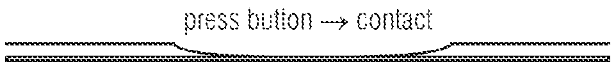

FIG. 2 and FIG. 2*a* illustrate a second preferred embodiment of a button of a switch assembly (SA) (released and pressed state).

Figure 1A:
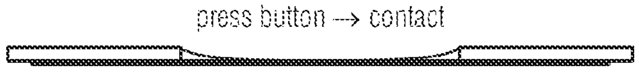
Figure 3:
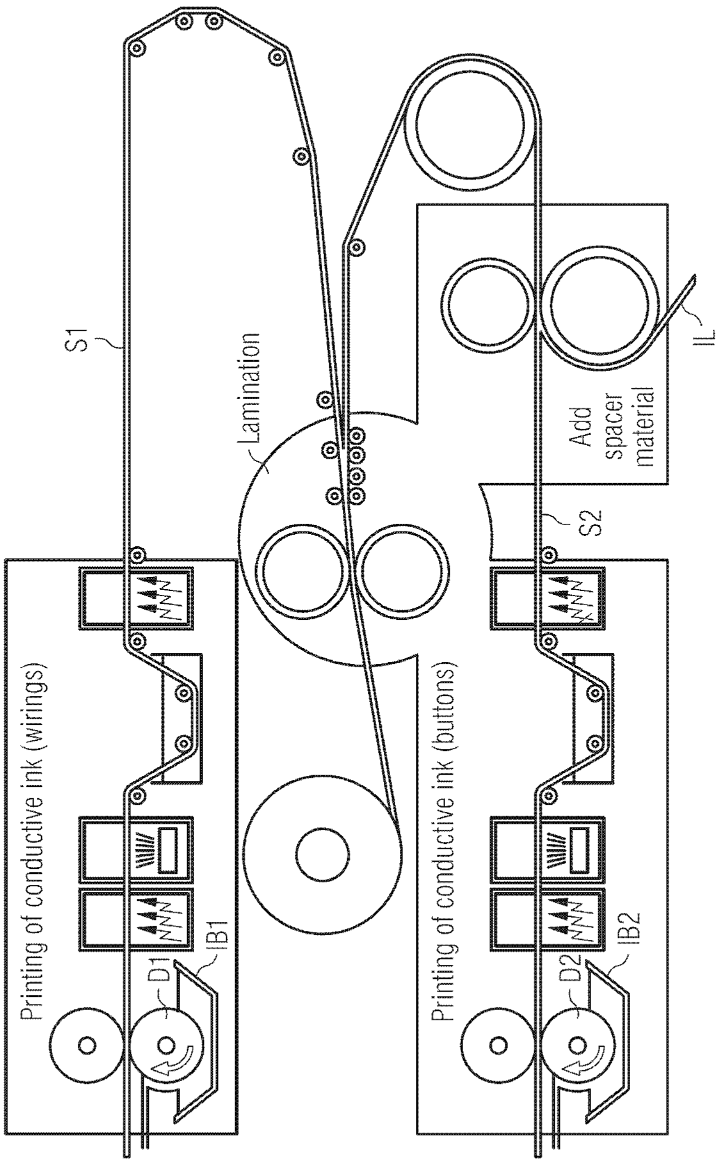

FIG. 3 shows a schematic assembly of a facility to produce a switch assembly (SA) according to FIG. 1 and FIG. 1*a*.

Figure 4:
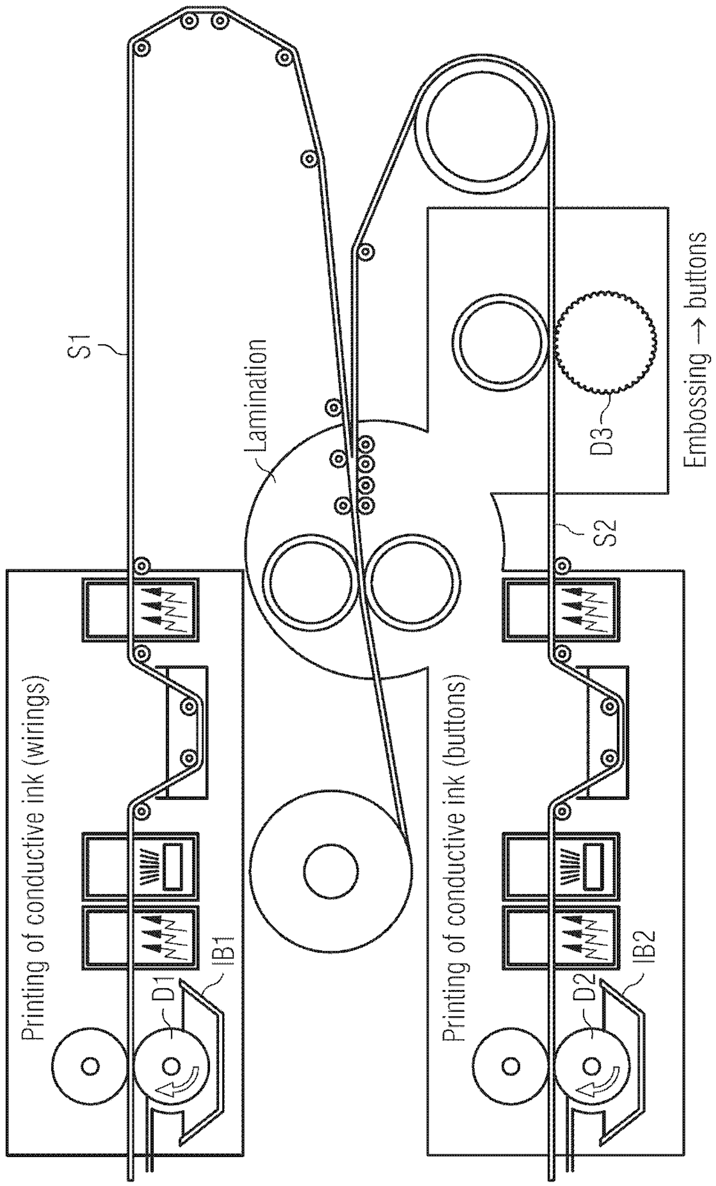

FIG. 4. shows a schematic assembly of a facility to produce a switch assembly (SA) according to FIG. 2 and FIG. 2*a*

Figure 5A:
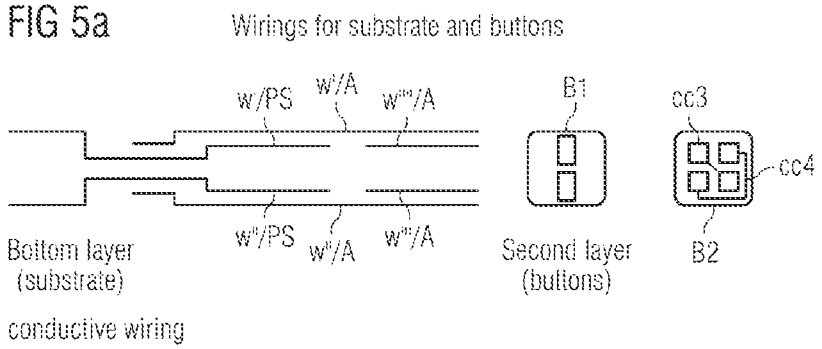
Figure 5B:
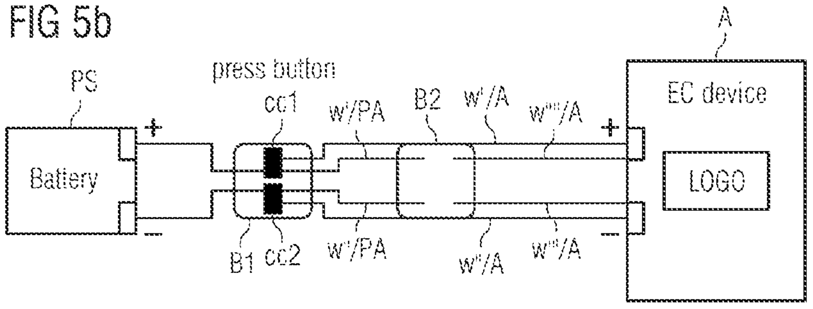
Figure 5C:
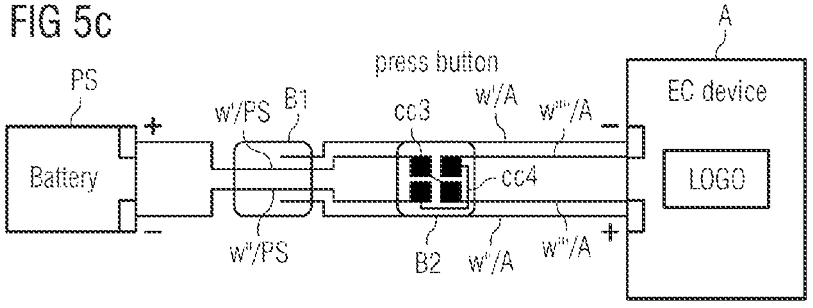

FIG. 5*a*, FIG. 5*b*, and FIG. 5*c* show a schematic electrical circuit including a switch assembly (SA) according to this invention.

In the following a switch assembly according to FIG. 1 and FIG. 1*a* will be described in more detail.

FIG. 1 and FIG. 1*a* are cross sections of a button (released and pressed state) which comprises a first substrate (S1), an interlayer (IL), i.e. an insulation layer, and a second substrate (S2), said interlayer (IL) is between the first substrate (S1) and the second (S2) substrate. The substrates can be paper, cardboard or a polymer. The insulation layer is preferably a polymer material. Even more preferred the interlayer (IL) is an insulating (dielectric) material, like PET, PEN, polyimide, or PMMA. On the other hand the substrates (S1) and (S2) are polyethylene coated cardboard. Further one surface of the substrate (S1) faces the interlayer (IL), i.e. the insulation layer, and the insulation layer (IL) contains a hole (H1). The substrate (S1) as well as the substrate (S2) is laminated on the interlayer (IL) and thus a hollow space is formed by the hole (H1) and the two substrates. A conductive pattern (not shown) is fixed on the surface of the second substrate (S2) which faces the insulation layer (IL) and is located above the hole, so that the conductive pattern forms with the hole the button. Opposite to the conductive pattern wirings (not shown) are fixed on the substrate (S1). Thus in case the button is pushed (FIG. 1*a*) the conductive pattern comes in contact with the wirings on the substrate (S1) enabling a current flow. In case the button is released (FIG. 1) the conductive pattern and the wirings are unconnected.

As shown in FIG. 3 the wirings are printed on the substrate (S1) by passing the substrate (S1) over a rotating drum (D1). The surface of the drum (D1) shows as specific pattern, which is wetted with a conductive ink as the drum (D1) rotates through an ink bath (IB1). When passing the substrate (S1) over the wetted the drum (D1) the pattern of the drum is displayed as the wiring pattern on the substrate (S1). Of course also other techniques are applicable, like rotary screen (the ink is in the roll and it is squeeged through patterned screens), flexography (photocurable rubber roll with patterns between drum (D1, anilox roll) and substrate (S1) which tranfers ink to the substrate), and inkjet printing technique (inkjet print head instead of roll). Simultaneously a conductive pattern is printed on the substrate (S2) by passing the substrate (S2) over a second rotating drum (D2). The surface of the drum (D2) shows as specific pattern (different to the pattern of drum (D1)), which is wetted with a conductive ink as the drum (D2) rotates through an ink bath (IB2). When passing the substrate (S2) over the wetted drum (D2) the pattern of the drum is displayed as the conductive pattern on the substrate (S2). Afterwards the wirings and conductive pattern, respectively, are fixed on the substrates by passing the substrates through an oven/drying assembly (thermal curing, infrared curing, UV curing and/or washing bath) removing the solvent from the ink. Subsequently the printed surface of substrate (S2) is covered with an interlayer (IL) with punched openings and both the substrate (S1) and the substrate (S2) covered with the interlayer (IL) are guided to the lamination unit in a way that the printed surfaces of the substrate (S) face each the interlayer (IL).

FIG. 2 and FIG. 2*a* are cross sections of a button (released and pressed state) which comprises a first substrate (S1) and a second substrate (S2) being laminated together. The substrates (S1) and (S2) can be for instance polyethylene coated cardboards. The second substrate (S2) comprises an embossing being convex to the surface of the substrate (S1). A conductive pattern (not shown) being fixed on the surface of the second substrate (S2) which faces the first substrate (S1) and being located in the embossing forms a button. Further the embossing of the substrate (S2) with the surface of the substrate (S1) facing the substrate (S2) form a hollow space. Opposite to the conductive pattern wirings (not shown) are fixed on the substrate (S1). Thus in case the button is pushed (FIG. 2*a*) the conductive pattern comes in contact with the wirings on the substrate (S1) enabling a current flow. In case the button is released (FIG. 2) the conductive pattern and the wirings are unconnected.

As shown in FIG. 4 the wirings are printed on the substrate (S1) by passing the substrate (S1) over a rotating drum (D1). The surface of the drum (D1) shows as specific pattern, which is wetted with a conductive ink as the drum (D1) rotates through an ink bath (IB1). When passing the substrate (S1) over the wetted drum (D1) the pattern of the drum is displayed as the wiring pattern on the substrate (S1). Also here other printing methods and arrangements are possible. Reference is made to those mentioned above. Simultaneously a conductive pattern is printed on the substrate (S2) by passing the substrate (S2) over a second rotating drum (D2). The surface of the drum (D2) shows as specific pattern (different to the pattern of drum (D1)), which is wetted with a conductive ink as the drum (D2) rotates through an ink bath (IB2). When passing the substrate (S2) over the wetted the drum (D2) the pattern of the drum is displayed as the conductive pattern on the substrate (S2). Afterwards the wirings and conductive pattern, respectively, are fixed on the substrates by passing the substrates through an oven/drying assembly (thermal curing, infrared curing, UV curing and/or washing bath) removing the solvent from the ink. Subsequently the printed surface of substrate (S2) is guided over a further drum (D3) having protrusions initiating embossings in the substrate 2 and both the substrate (S1) and the substrate (S2) are guided to the lamination unit in a way that the printed surfaces of the substrates face each other.

In FIG. 5*a*, FIG. 5*b* and FIG. 5*c* show an electrical circuit comprising a power source (PS), an appliance (A), namely a electrochemical device or lectrochromic device (display), and a switch assembly (SA) for changing the direction of current from said power source (PS) to said appliance (A), said switch assembly (SA) comprises six wirings, two of the wirings (W'/PS) and (W"/PS) are connected with the power source (PS) and the remaining four wirings (W'/A), (W"/A), (W'"/A) and (W""/A), are connected with the appliance (A), wherein the wirings (W'/A) and (W""/A) lead to one connection port of the appliance (A) whereas the wirings (W"/A) and (W'"/A) lead to the other connection port of the appliance (A). Further all wirings are fixed on a surface (SF1) of a substrate (S1) (not shown) and none of the wirings are directly connected to each other. The switch assembly (A) comprises further a first button (B1) comprising a first conductive pattern (CP1) on one surface (SF2') of said button (B1), wherein the conductive pattern (CP1) consists of two conductive contacts (CC1) and (CC2). Additionally the switch assembly comprises a second button (B2) comprising a second conductive pattern (CP2) on one surface (SF2") of said button (B2), wherein the conductive pattern (CP2) consists of two conductive contacts (CC3) and (CC4). The surfaces (SF2') and (SF2") of the buttons (B1) and (B2) on which the conductive patterns (CP1) and (CP2) are arranged face the surface (SF1) of said substrate (S1) where the wirings are arranged. The buttons (B1) and (B2) are preferably fixed on the substrate (S1) as shown in FIGS. 1, 1*a*, 2, and 2*a*. As can be seen in particular in FIG. 5*b* and 5*c* the conductive patterns (CP1) and (CP2) (including the conductive contacts (CC1) to (CC4)) on the buttons (B1) and (B2) and said wirings on the surface (SF1) of the substrate (S1) are arranged in such a manner and said buttons (B1) and (B2) are placed on said substrate (S1) in such manner, that the button (B1) connects (a) by means of the conductive contact (CC1) of the conductive pattern (CP1) in a pressed state the first wiring (W'/PS) with the wiring (W'/A) and (b) by means of the conductive contact (CC2) of the conductive pattern (CP1) in a pressed state the second wiring (W"/PS) with the wirings (W"/A)

to enable a first current direction between said power source (PS) and said appliance (A), and the button (B2) connects (c) by means of the conductive contact (CC3) of the conductive pattern (CP2) in a pressed state the first wiring (W'/PS) with the wiring (W'"/A) and (d) by means of the conductive contact (CC4) of the conductive pattern (CP2) in a pressed state the second wiring (W"/PS) with the wiring (W""/A)

to enable a reversed current direction in regard to the first current direction between said power source (PS) and said appliance (A).

The invention is not only directed to the switch assembly (SA) and the electric circuit as defined in the present invention, but also to the use of the instant switch assembly (SA) in an electrical circuit.

The invention will be now described in more detail by way of examples.

EXAMPLES

Example 1

R2R Screen Printing of Silver Ink on Single Substrate

Roll of polyethylene-coated cardboard (S1) (Performa Nature PE, Stora Enso) was installed to unwinder and guided through printing unit (D1) and drying oven to a rewinder unit. Rotary screen printing unit (D1) with patterned 230L cylinder having a ink laydown 8 μm and mesh width 56 μm was loaded with Ciba Xymara Electra SSB-111 conductive silver ink. The pattern in the screen cylinder corresponds to conductive wiring and buttons to be printed on substrate. Buttons were printed as mirrored image on the substrate in the way that when substrate is folded buttons and wirings are positioned to form the polarity switch device. The web speed was set to 2 m/min and drying temperature of oven was set to 120° C. The measured film thickness of printed silver was ~11 μm and RMS roughness was ~1.5 μm. Sheet resistivity of printed silver was ~20 mΩ/□ which was measured using 4-probe measurement at probe distance of 1 cm.

Example 2

R2R Screen Printing of Silver Ink on Single Substrate Using Spacer

Roll of polyethylene-coated cardboard (S2) (Performa Nature PE, Stora Enso) was installed to unwinder and guided through printing unit (D2) and drying oven to a rewinder unit. Rotary screen printing unit (D2) with patterned 230L cylinder having a ink laydown 8 μm and mesh width 56 μm was loaded with Ciba Xymara Electra SSB-111 conductive silver ink. The pattern in the screen cylinder corresponds to conductive wiring and buttons to be printed on substrate. Buttons were printed as mirrored image on the substrate in the way that when substrate is folded buttons and wirings are positioned to form the polarity switch device. The substrate (S2) was combined with lamination unit that attach polyethylene terephtalate (IL) (PET, Melinex 401, DuPont, thickness 50 μm) on substrate (S2). Prior to lamination the PET substrate (IL) was guided through die-cutter which punches holes to form corresponding windows for buttons. The web speed was set to 2 m/min and drying temperature of oven was set to 120° C. The measured film thickness of printed silver was ~11 μm and RMS roughness was ~1.5 μm. Sheet resistivity of printed silver was ~20 mΩ/□ which was measured using 4-probe measurement at probe distance of 1 cm.

Example 3

R2R Screen Printing of Silver Ink on Single Substrate with Embossing

Roll of polyethylene-coated cardboard (S2) (Performa Nature PE, Stora Enso) was installed to unwinder and guided through printing unit (D2), drying oven and embossing unit (D3) to a rewinder unit. Rotary screen printing unit (D2) with patterned 230L cylinder having a ink laydown 8 μm and mesh width 56 μm was loaded with Ciba Xymara Electra SSB-111 conductive silver ink. The pattern in the screen cylinder (D2) corresponds to conductive wiring and buttons to be printed on substrate (S2). The embossing unit (D3) deforms the substrate (S2) only where buttons were printed. Buttons were printed as mirrored image on the substrate in the way that when substrate is folded buttons and wirings are positioned to form the polarity switch device. The web speed was set to 2 m/min and drying temperature of oven was set to 120° C. The measured film thickness of printed silver was ~11 μm and RMS roughness was ~1.5 μm. Sheet resistivity of printed silver was ~20 mΩ/□ which was measured using 4-probe measurement at probe distance of 1 cm.

Example 4

R2R Screen Printing of Silver Ink on Two Substrates with Embossing

Rolls of polyethylene-coated cardboard (S1, S2) (Performa Nature PE, Stora Enso) were installed to two separate unwinders and guided through printing units (D1, D2) and drying ovens via common lamination unit to common rewinder unit. The other cardboard substrate (S2), which was used for printing buttons were also guided through embossing unit (D3), which was positioned after drying oven. Rotary screen printing units (D1, D2) with patterned 230L cylinders having a ink laydown 8 μm and mesh width 56 μm was loaded with Ciba Xymara Electra SSB-111 conductive silver ink. The pattern in the other rotary screen cylinder (D1) corresponds to conductive wiring and in other rotary screen cylinder (D2) to buttons, respectively. Both screen printing unit cylinders were positioned in the way that laminated wiring and buttons forms a polarity switch device. The embossing unit (D3) deforms the substrate to form buttons on the location where buttons were printed. The web speed was set to 2 m/min and drying temperature of oven was set to 120° C. The measured film thickness of printed silver was ~11 μm and RMS roughness was ~1.5 μm. Sheet resistivity of printed silver was ~20 mΩ/□ which was measured using 4-probe measurement at probe distance of 1 cm. Lamination unit combines and glues the both button and wiring substrates in to a rewinder to form a roll of polarity switch devices.

Example 5

R2R Screen Printing of Silver Ink on Two Different Substrates with Embossing

Roll of polyethylene-coated cardboard (S2) (Performa Nature PE, Stora Enso) were installed to unwinder and guided through printing unit (D2) and drying oven via common lamination unit to common rewinder unit. Roll of polyethylene terephtalate (S1) (PET, 3M, thickness 125 μm) was installed to other unwinder and guided through printing unit (D1) and drying oven via common lamination to common rewinder unit with cardboard substrate. The cardboard substrate (S2), which was used for printing buttons were also guided through embossing unit (D3). Rotary screen printing units with patterned 230L cylinders having a ink laydown 8 μm and mesh width 56 μm was loaded with Ciba Xymara Electra SSB-111 conductive silver ink. The pattern in the screen cylinder (D1) for PET corresponds to conductive wiring and in screen cylinder (D2) for cardboard corresponds to buttons. Both screen printing unit cylinders were positioned in the way that laminated wiring and buttons forms a polarity switch device. The embossing unit (D3) deforms the cardboard substrate to form buttons and the embossing cylinder was positioned in the way that deformation occurs on printed silver after drying oven. The web speed was set to 2 m/min and drying temperature of oven was set to 120° C. The measured film thickness of printed silver was 11 μm and RMS roughness was 1.5 μm. Sheet resistivity of printed silver was 20 mΩ/□ which was measured using 4-probe measurement at probe distance of 1 cm. Lamination unit combines and glues the both button and wiring substrates in to a rewinder to form a roll of polarity switch devices.

Example 6

R2R Screen Printing of Silver Ink on Two Substrates Using Spacer

Rolls of polyethylene-coated cardboard (S1, S2) (Performa Nature PE, Stora Enso) were installed to two separate unwinders and guided through printing units (D1, D2) and drying ovens via common lamination unit to common rewinder unit. The other substrate (S2), which was used for printing buttons were combined with lamination unit that attach polyethylene terephtalate (IL) (PET, Melinex 401, DuPont, thickness 50 μm) on cardboard substrate (S2). The PET substrate (IL) was guided through die-cutter which punches holes to form corresponding windows for buttons. Rotary screen printing units with patterned 230L cylinders having a ink laydown 8 μm and mesh width 56 μm was loaded with Ciba Xymara Electra SSB-111 conductive silver ink. The pattern in the other screen cylinder (D1) corresponds to conductive wiring and in other screen cylinder (D2) to buttons. Screen printing unit cylinders (D1, D2) and lamination unit for die-cutted spacer material (IL) were positioned in the way that laminated end-product with wiring and buttons forms a polarity switch device. The web speed was set to 2 m/min and drying temperature of oven was set to 120° C. The measured film thickness of printed silver was 11 μm and RMS roughness was 1.5 μm. Sheet resistivity of printed silver was 20 mΩ/□ which was measured using 4-probe measurement at probe distance of 1 cm. The common lamination unit combines and glues the both button and wiring substrates in to a rewinder to form a roll of polarity switch devices.

Example 7

R2R Screen Printing of Silver Ink on all Plastic Substrates Using Spacer

Rolls of polyethylenenaphtalene (S1, S2) (PEN, Teonex Q51, Dupont teijing films, thickness 50 μm) were installed to two separate unwinders and guided through printing units (D1, D2) and drying ovens via common lamination unit to common rewinder unit. The other substrate (S2), which was used for printing buttons were combined with lamination unit that attach polyethylene terephtalate (IL) (PET, Melinex 401, DuPont, thickness 50 μm) on cardboard substrate (S2). The PET substrate (IL) was guided through die-cutter which punches holes to form corresponding windows for buttons. Rotary screen printing units with patterned 230L cylinders having a ink laydown 8 μm and mesh width 56 μm was loaded with Ciba Xymara Electra SSB-111 conductive silver ink. The pattern in the other screen cylinder (D1) corresponds to conductive wiring and in other screen cylinder (D2) to buttons. Screen printing unit cylinders (D1, D2) and lamination unit for die-cutted spacer material (IL) were positioned in the way that laminated end-product with wiring and buttons forms a polarity switch device. The web speed was set to 2 m/min and drying temperature of oven was set to 120° C. The measured film thickness of printed silver was 11 μm and RMS roughness was 1.5 μm. Sheet resistivity of printed silver was 20 mΩ/□ which was measured using 4-probe measurement at probe distance of 1 cm. The common lamination unit combines and glues the both button and wiring substrates in to a rewinder to form a roll of polarity switch devices.

Example 8

R2R Inkjet Printing of Silver Ink on One Plastic Substrate Using Spacer

Roll of polyethylenenaphtalene (S2) (PEN, Teonex Q51, Dupont teijing films, thickness 50 μm) was installed to unwinder and guided through printing unit (D2) and drying ovens via lamination unit to rewinder unit. The substrate (S2) was combined with lamination unit that attach polyethylene terephtalate (IL) (PET, Melinex 401, DuPont, thickness 50 μm) on substrate (S2). The PET substrate (IL) was guided through die-cutter which punches holes to form corresponding windows for buttons. Inkjet unit having Spectra SQ128 printhead was loaded with Cabot CCl-300 conductive nanosilver ink. The printed pattern corresponds to conductive wirings and buttons. Buttons were printed as mirrored image on the substrate in the way that when substrate is folded buttons and wirings are positioned to form the polarity switch device. Die-cutted spacer material (IL) were positioned in the way that folded end-product with wiring and buttons forms a polarity switch device. The web speed was set to 6 m/min and drying temperature of oven was set to 140° C. Sheet resistivity of printed silver was 40 mΩ/□ which was measured using 4-probe measurement at probe distance of 1 cm.

Example 9

R2R Flexography Printing of Polyaniline on all Plastic Substrates Using Spacer

Rolls of polyethylenenaphtalene (S1, S2) (PEN, Teonex Q51, Dupont teijing films, thickness 50 μm) were installed to two separate unwinders and guided through flexography printing units (D1, D2) and drying ovens via common lamination unit to common rewinder unit. The other substrate (S2), which was used for printing buttons were combined with lamination unit that attach polyethylene terephtalate (IL) (PET, Melinex 401, DuPont, thickness 50 μm) on cardboard substrate (S2). The PET substrate (IL) was guided through die-cutter which punches holes to form corresponding windows for buttons. Flexography printing unit was loaded with Panipol T conductive polyaniline ink.

The pattern in the other flexography cylinder (D1) corresponds to conductive wiring and in other flexography cylinder (D2) to buttons. Flexography printing unit cylinders (D1, D2) and lamination unit for die-cutted spacer material (IL) were positioned in the way that laminated end-product with wiring and buttons forms a polarity switch device. The web speed was set to 40 m/min and drying temperature of oven was set to 140° C. The measured film thickness of printed polyaniline was 0.45 μm. Sheet resistivity of printed polyaniline was 120 mΩ/□ which was measured using 4-probe measurement at probe distance of 1 cm. The common lamination unit combines and glues the both button and wiring substrates in to a rewinder to form a roll of polarity switch devices.

Example 10

R2R Gravure Printing of Polyaniline on all Plastic Substrates Using Spacer

Rolls of polyethyleneterehtalene (S1, S2) (PET, 3M, thickness 125 μm) were installed to two separate unwinders and guided through gravure printing units (D1, D2) and drying ovens via common lamination unit to common rewinder unit. The other substrate (S2), which was used for printing buttons were combined with lamination unit that attach polyethylene terephtalate (IL) (PET, Melinex 401, DuPont, thickness 50 μm) on cardboard substrate (S2). The PET substrate (IL) was guided through die-cutter which punches holes to form corresponding windows for buttons. Gravure printing unit was loaded with Panipol T conductive polyaniline ink. The pattern in the other gravure cylinder (D1) corresponds to conductive wiring and in other gravure cylinder (D2) to buttons.

Gravure printing unit cylinders (D1, D2) and lamination unit for die-cutted spacer material (IL) were positioned in the way that laminated end-product with wiring and buttons forms a polarity switch device. The web speed was set to 100 m/min. Sheet resistivity of printed polyaniline was 120 mΩ/□ which was measured using 4-probe measurement at probe distance of 1 cm. The common lamination unit combines and glues the both button and wiring substrates in to a rewinder to form a roll of polarity switch devices.

The invention claimed is:

1. A switch assembly (SA) for changing a direction of current from a power source (PS) to an appliance (A), the switch assembly comprising:

at least four wirings, of which two wirings (W/PS) are configured to connect with the power source (PS), and remaining wirings (W/A) are configured to connect with the appliance (A), a substrate (S1), comprising a surface (SF1) to which all of the wirings are fixed, a first button (B1) comprising a first conductive pattern (CP1) on a surface (SF2') of the first button (B1), and a second button (B2) comprising a second conductive pattern (CP2) on a surface (SF2") of the second button (B2), wherein none of the at least four wirings are directly connected to each other, the surfaces (SF2') and (SF2") of the first and second buttons (B1) and (B2) face the surface (SF1) of the substrate (S1), the buttons (B1) and (B2) are fixed, directly or via an interlayer (IL), on the substrate (S1), the conductive patterns (CP1) and (CP2) on the buttons (B1) and (B2) are not in contact with the wirings when the buttons (B1) and (B2) are in an unpressed state, when the button (B1) is in a pressed state, the button (B1) simultaneously connects the first wiring of the two wirings (W/PS) with one wiring of the remaining wirings (W/A) and the second wiring of the two wirings (W/PS) with another wiring of the remaining wirings (W/A), via the first conductive pattern (CP1), thereby enabling a first current path through the switch assembly, and when the button (B2) is in a pressed state, the button (B2) connects the first wiring of the two wirings (W/PS) with one wiring of the remaining wirings (W/A) and the second wiring of the two wirings (W/PS) with another wiring of the remaining wirings (W/A) via the second conductive pattern (CP2), thereby enabling a second current path through the switch assembly, the second current path is different from the first current path, the conductive patterns (CP1) and (CP2) comprise a composition (CO) comprising a polymer and a conductive material dispersed in the polymer; a conjugated polymer; or both.

2. The switch assembly (SA) of claim 1, wherein the at least four wirings comprise:

a composition (CO) comprising a polymer and a conductive material dispersed in the polymer;

a conjugated polymer;

or both.

3. The switch assembly (SA) of claim 1, wherein (i) the conductive patterns (CP1) and (CP2) are printed on the buttons (B1) and (B2);

(ii) the wirings are printed on the substrate (S1); or (iii) both (i) and (ii).

4. The switch assembly (SA) of claim 1, wherein, when the button (B1) is in a pressed state, the button (B1) simultaneously connects the first wiring (W'/PS) of the two wirings (W/PS) with a wiring (W'/A) of the remaining wirings (W/A), and the second wiring (W"/PS) of the two wirings (W/PS) with another wiring (W"/A) of the remaining wirings (W/A), via the first conductive pattern (CP1), thereby enabling the first current path, and when the button (B2) is in a pressed state, the button (B2) connects, via the second conductive pattern (CP2), the first wiring (W'/PS) of the two wirings (W/PS) with a wiring of the remaining wirings (W/A other than the wiring (W'/A), and connects, via the second conductive pattern (CP2), the second wiring (W"/PS) of the two wirings (W/PS) with a wiring of the remaining wirings (W/A)—other than the wiring (W"/A), thereby enabling the second current path.

5. The switch assembly (SA) of claim 1, wherein, when the button (B1) is in a pressed state, the button (B1) simultaneously connects the first wiring (W'/PS) of the two wirings (W/PS) with a first wiring (W'/A) of the remaining wirings (W/A) and the second wiring (W"/PS) of the two wirings (W/PS) with a second wiring (W"/A) of the remaining wirings (W/A) via the first conductive pattern (CP1), thereby enabling the first current path, when the button (B2) is in a pressed state, the button (B2) the first wiring (W'/PS) of the two wirings (W/PS) with the second wiring (W"/A) of the remaining wirings (W/A), and the second wiring (W"/PS) of the two wirings (W/PS) with the first wiring (W'/A) of the remaining wirings (W/A) via the second conductive pattern (CP2), thereby enabling the second current path, the second current path has a reversed current direction in regard to a first current direction of the first current path, and both the first current path and the second current path are between the power source (PS) and the appliance (A).

6. The switch assembly (SA) of claim 1, comprising:

six wirings, of which two wirings (W/PS) are configured to connect with the power source (PS) and remaining four wirings (W/A) are configured to connect with the appliance (A), wherein either:

(a)(i) when the button (B1) is in a pressed state, the button (B1) simultaneously connects the first wiring (W'/PS) of the two wirings (W/PS) with a first wiring (W'/A) of the remaining four wirings (W/A) and the second wiring (W"/PS) of the two wirings (W/PS) with a second wiring (W"/A) of the remaining four wirings (W/A) via the first conductive pattern (CP1), thereby enabling the first current path, and (ii) when the button (B2) is in a pressed state, the button (B2) connects the first wiring (W'/PS) of the two wirings (W/PS) with the second wiring (W"/A) of the remaining four wirings (W/A), and the second wiring (W"/PS) of the two wirings (W/PS) with the first wiring (W'/A) of the remaining four wirings (W/A) via the second conductive pattern (CP2), thereby enabling the second current path, (iii) the second current path has a reversed current direction in regard to a first current direction of the first current path, and (iv) both the first current path and the second current path are between the power source (PS) and the appliance (A); or (b)(i) the first conductive pattern (CP1) of the first button (B1) comprises a first conductive contact (CC1) and a second conductive contact (CC2), (ii) when the button (B1) is in a pressed state, the first conductive contact (CC1) connects the first wiring (W'/PS) of the two wirings (W/PS) with first wiring (W'/A) of the remaining four wirings (W/A), and the second conductive contact (CC2) connects the second wiring (W"/PS) of the two wirings (W/PS) with the second wiring (W"/A) of the remaining four wirings (W/A), thereby enabling the first current path, (iii) the second button (B2) comprises a first conductive contact (CC3) and a second conductive contact (CC4), (iv) when the button (B2) is in a pressed state, the first conductive contact (CC3) connects the first wiring (W'/PS) of the two wirings (W/PS) with a third wiring (W'"/A) of the remaining four wirings (W/A), and the second conductive contact (CC4) connects the second wiring (W"/PS) of the two wirings (W/PS) with a fourth wiring (W""/A) of the remaining four wirings (W/A), thereby enabling the second current path, (v) the second current path has a reversed current direction in regard to a first current direction of the first current path, and (vi) both the first current path and the second current path are between the power source (PS) and the appliance (A).

7. The switch assembly (SA) of claim 1, further comprising a second substrate (S2), wherein the surface (SF1) faces the substrate (S2), the substrates (S1) and (S2) are laminated together, the second substrate (S2) comprises two embossings, which are convex to the surface (SF1), the first conductive pattern (CP1) and second conductive pattern (CP2) are fixed on a surface of the second substrate (S2) which faces the first substrate (S1), the first conductive pattern (CP1) is located in a first embossing of the two embossings, the second conductive pattern (CP2) is located in a second embossing of the two embossings the first button (B1) comprises the first conductive pattern (CP1) with the first embossing, and the second button (B2) comprises the second conductive pattern (CP2) with the second embossing.

8. The switch assembly (SA) of claim 1, further comprising:

a second substrate (S2), and an insulation layer (IL) between the first substrate (S1) and the second substrate (S2), wherein the surface (SF1) of the substrate (S1) faces the insulation layer, the insulation layer (IL) comprises two holes, the first conductive pattern (CP1) and the second conductive pattern (CP2) are fixed on a surface of the second substrate (S2) which faces the insulation layer (IL), the first button (B1) comprises the first conductive pattern (CP1) above one of the two holes in the insulation layer (IL), the second button (B2) comprises the second conductive pattern (CP2) above the other of the two holes in the insulation layer (IL).

9. The switch assembly (SA) of claim 1, wherein at least one of the conductive patterns (CP1) and (CP2) comprises a composition (CO) comprising a polymer and a conductive material dispersed in the polymer, the polymer is at least one polymer selected from the group consisting of a polyalkylene, a polyimide, an epoxy resin, a phenolic resin, a polyester, a styrene-butadiene block copolymer, an alkylene-vinyl acetate, an alkylene-vinyl chloride copolymer, and a polyamide, and the conductive material is selected from the group consisting of indium tin oxide, antimony tin oxide, platinum, palladium, silver, gold, nickel, copper, carbon, and iron.

10. The switch assembly (SA) of claim 1, wherein at least one of the conductive patterns (CP1) and (CP2) comprises a conjugated polymer, and the conjugated polymer is at least one polymer selected from the group consisting of polyacetylene, polyphenylene, polyphenylene sulfide ("PPS"), polyphenylene vinylene (PPV), polypyrrole, polythiophene, and polyaniline.

11. The switch assembly (SA) of claim 1, wherein the substrate (S1) is selected from the group consisting of paper, cardboard, polyethylene coated cardboard, polyethylene, polypropylene, polyester, and a polyvinyl halide.

12. The switch assembly (SA) of claim 1, wherein power source (PS) is a battery or a direct current (DC) source.

13. The switch assembly (SA) of claim 1, wherein the appliance (A) is selected from the group consisting of a display, an electrical motor, and a speaker.

14. A method of changing a direction of current in an electrical circuit between a power source (PS) and an appliance (A), comprising changing the direction of the current with the switch assembly of claim 1.

15. An electrical circuit, comprising:

a power source (PS), an appliance (A), and the switch assembly (SA) of claim 1, wherein the switch assembly is configured to change a direction of current from the power source (PS) to the appliance (A).

16. A process for preparing the switch assembly of claim 1, the process comprising:

(a) fixing the at least four wirings on a surface (SF1) of the first substrate (S1);

(b) printing a composition of (i) a polymer, a conductive material, and a solvent, (ii) conjugated polymer and a solvent, or (iii) both (i) and (ii) on a second substrate (S2), thereby obtaining the conductive patterns (CP1) and (CP2) on one surface (SF1') of the second substrate (S2);

(c) removing the solvent, thereby adhering the conductive patterns (CP1) and (CP2) on the surface of the substrate (S2); and (d) either (d1) embossing the second substrate (S2) where the conductive patterns (CP1) and (CP2) are located and laminating both substrates (S1) and (S2) on the respective surfaces (SF1) and (SF1'), or (d2) laminating the first substrate (S1), the second substrate (S2), and an insulation layer (IL) comprising two holes between the first and second substrate, wherein each of the conductive patterns (CP1) and (CP2) is located above one of the holes, and each button comprises a conductive pattern with one hole;

wherein the surface (SF1) of the first substrate (S1) faces the surface (SF1') of the second substrate (S2).

17. The switch assembly of claim 1, wherein the conductive patterns (CP1) and (CP2) consist of:

a composition (CO) comprising a polymer and a conductive material dispersed in the polymer;

a conjugated polymer; or both.

18. The switch assembly (SA) of claim 2, wherein the wirings consist of:

a composition (CO) comprising a polymer and a conductive material dispersed in the polymer;

a conjugated polymer; or both.

19. The switch assembly (SA) of claim 1, wherein the first conductive pattern (CP1) of the first button (B1) comprises two conductive contacts (CC1) and (CC2), when the button (B1) is in a pressed state, the first conductive conduct (CC1) connects the first wiring (W'/PS) of the two wirings (W/PS) with a first wiring (W'/A) of the remaining wirings (W/A), and the second conductive contact (CC2) connects the second wiring (W"/PS) of the two wirings (W/PS) with a second wiring (W"/A) of the remaining wirings (W/A), thereby enabling the first current path, the second button (B2) comprises two conductive contacts (CC3) and (CC4), when the button (B2) is in a pressed state, the first conductive conduct (CC3) connects the first wiring (W'/PS) of the two wirings (W/PS) with the second wiring (W"/A) of the remaining wirings (W/A), and the second conductive contact (CC4) connects the second wiring (W"/PS) of the two wirings (W/PS) with the first wiring (W'/A) of the remaining wirings (W/A), thereby enabling the second current path, the second current path has a reversed current direction in regard to a first current direction of the first current path, and both the first current path and the second current path are between the power source (PS) and the appliance (A).

20. The switch assembly of claim 6, wherein the first wiring (W'/A) and the fourth wiring (W""/A) of the remaining four wirings (W/A) both lead to a first connector (C'/A) of the appliance (A), and the second wiring (W"/A) and the third wiring (W'"/A) of the remaining four wirings (W/A) both lead to a second connector (C'/A) of the appliance (A).

* * * * *